H. SMITH.
Metal Turning Tool.
No. 207,562. Patented Aug. 27, 1878.
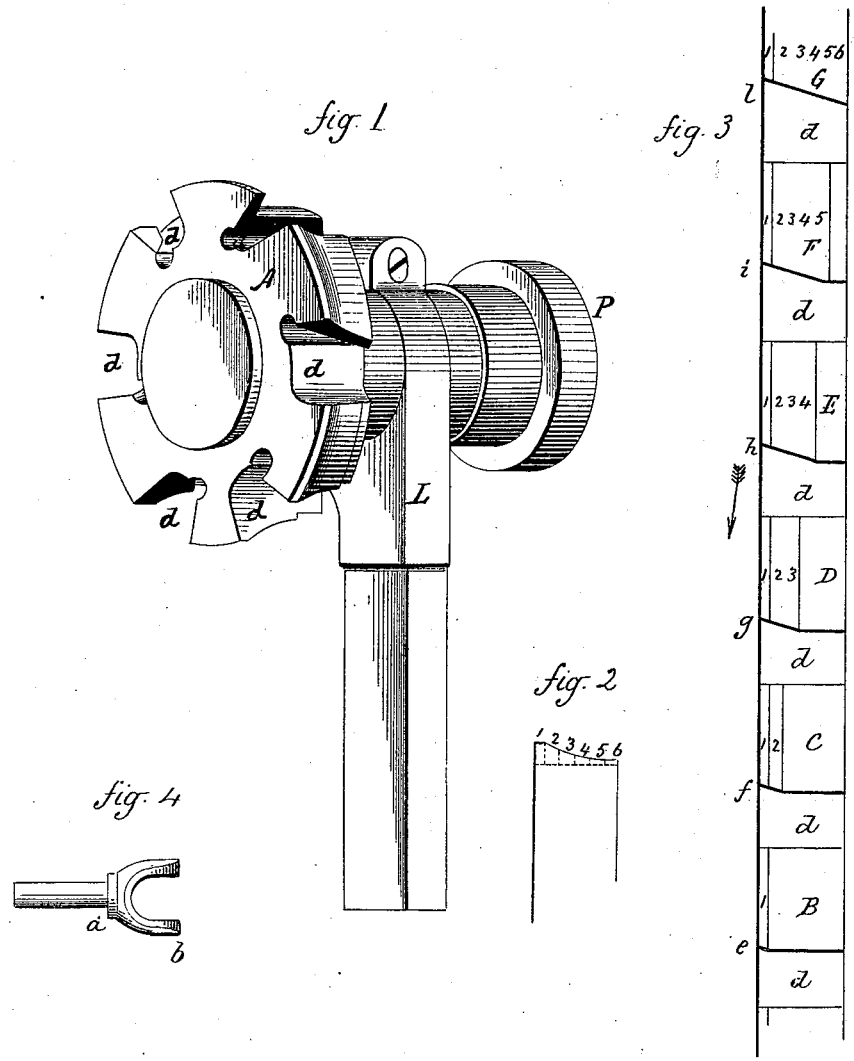

UNITED STATES PATENT OFFICE.

HENRY SMITH, OF WEST MERIDEN, CONNECTICUT, ASSIGNOR OF ONE-HALF HIS RIGHT TO JOS. F. KELLY, OF SAME PLACE.

IMPROVEMENT IN METAL-TURNING TOOLS.

Specification forming part of Letters Patent No. 207,562, dated August 27, 1878; application filed July 12, 1878.

*To all whom it may concern:*

Be it known that I, HENRY SMITH, of West Meriden, in the county of New Haven and State of Connecticut, have invented a new Improvement in Metal-Turning Tools; and I do hereby declare the following, when taken in connection with the accompanying drawings and the letters of reference marked thereon, to be a full, clear, and exact description of the same, and which said drawings constitute part of this specification, and represent, in—

Figure 1, perspective view of the tool; Fig. 2, diagram showing the periphery of the tool; Fig. 3, diagram showing a transverse section or complete cut; Fig. 4, the article for which the tool is specially designed.

This invention relates to an improvement in tools for turning metal, specially designed for turning the joint of drawer-pulls, but applicable to other purposes, the object of the invention being to construct a single tool which, by an intermittent rotary movement, will successively present increasing portions of the cut from the beginning to the final or finishing cut of the entire surface; and it consists in the construction of the tool, as hereinafter described, and particularly recited in the claim.

The article for which this tool is specially designed is a part of the joint of a swinging drawer-pull, and is shown in Fig. 4, the portion of the article to be dressed being the outside, as from $a$ to $b$. Transversely the section is spherical, so that the shank of the article is placed in the mandrel of a lathe and caused to revolve. The surface is finished by the turning-tool, and for finishing this article a single tool is applied, cutting over the entire surface from $a$ to $b$. With the greatest care there will be more or less "chatter," and the article will require subsequent finish accordingly.

The new tool, by which the difficulty of chattering is overcome, consists of a head, A, of cylindrical form, its periphery in transverse section, as seen in Fig. 2, and of the shape corresponding to the surface of the article, as from $a$ to $b$, Fig. 4.

Into the periphery several longitudinal notches, $d$, are cut, more or less in number, and which form the throats of the cutters. Between these throats the surface is cut away by degrees—as, for instance, on the first portion, B, the whole is cut away except the portion 1 of Fig. 2; the next, C, is cut away, except 1 2; the next, D, one other section, is left, and so on, each section adding one portion until the whole is complete.

In using the tool, the first section, B, is presented, and the edge of the section 1, as at $e$, comes in contact and cuts away the metal from the article; then a partial rotation brings the next cutter and edge $f$ of the part 1 2 into action, the part 2 only cutting, 1 having already done its work. That completed, another partial rotation brings the edge $g$ of the next section, D, into action, and the additional portion 3 cuts away its portion of the surface, and so on through succeeding sections E, F, and G, more or less in number, their cutting-edges $h$ $i$ $l$ successively increasing, until the last cut takes the whole surface.

By this cutter so small a portion of the surface is attacked that chattering is impossible.

The cutter, as here represented, is arranged in a shank, L, by which it may be secured in the tool-stock, and the intermittent rotation may be imparted to it by turning the tool by hand, as by the head P.

The rotation need not be intermittent, because a constant rotation will successively bring the several cutting portions of the surface into action, and such a rotation may be imparted to the tool from the lathe itself, as will be well understood by those skilled in the art, it only being essential to this invention that the tool have the capacity of rotation.

It will be understood that for surfaces of different forms the cutter will be shaped accordingly, but the division so that but a portion of the surface of the article to be cut will be attacked at any one time.

I claim—

The herein-described turning-tool, consisting of the rotating head, having its periphery divided into a series of cutters, the first cutter taking but a portion of the surface longitudinally, and each successive cutter adding a portion to the preceding cutter, substantially as described.

HENRY SMITH.

Witnesses:
WM. E. BYRNE,
C. P. IVES.